United States Patent [19]

Riseman

[11] 3,886,025

[45] May 27, 1975

[54] FERRITE HEAD

[75] Inventor: Jacob Riseman, Poughkeepsie, N.Y.

[73] Assignee: International Business Machines Corporation, Armonk, N.Y.

[22] Filed: Aug. 24, 1972

[21] Appl. No.: 283,614

[52] U.S. Cl. .................. 156/325; 161/196; 29/603; 117/234; 179/100.2; 423/344

[51] Int. Cl. ......... C09j 5/00; G11b 5/42; H01f 7/06

[58] Field of Search ..................... 161/196; 423/344; 117/106 A, DIG. 12, 106 R, 235; 29/603; 179/100.2; 360/119, 120, 121; 156/325

[56] References Cited

UNITED STATES PATENTS

| | | | |
|---|---|---|---|
| 448,915 | 3/1891 | Erlwein | 117/DIG. 12 |
| 2,820,720 | 1/1958 | Iversen | 117/234 |
| 3,479,738 | 11/1969 | Hanak | 29/603 |
| 3,494,026 | 2/1970 | Sugaya | 360/120 |
| 3,544,982 | 12/1970 | Hanak | 340/174.1 F |
| 3,551,202 | 12/1970 | Wright et al. | 179/100.2 A |
| 3,562,444 | 2/1971 | Hoogendoorn | 340/174.1 F |
| 3,578,920 | 5/1971 | Okamoto et al. | 179/100.2 C |
| 3,650,737 | 3/1972 | Maissel et al. | 96/1.5 X |
| 3,663,767 | 5/1972 | Shimotori et al. | 179/100.2 C |
| 3,672,045 | 6/1972 | Robertson | 29/603 |
| 3,737,583 | 6/1973 | Tsuchiya et al. | 179/100.2 C |
| 3,778,896 | 12/1973 | Bagby | 29/603 |

OTHER PUBLICATIONS

Doo, V. Y. et al., Investigation of Refractory Dielectives for Integrated Circuits, (prepared by I.B.M. for N.A.S.A.) March 1968, page 4.

Groben et al., "Wear Coating for a Tape Head," IBM Technical Disclosure Bulletin, Vol. 9, No. 9, Feb. 1967.

Stoller et al., "Novel Technique for Forming Glass-to-Metal Seals Using a Silicon Nitride Interface Layer," RCA Review, (June 1970), pp. 443–449.

*Primary Examiner*—George F. Lesmes
*Assistant Examiner*—Patricia C. Ives
*Attorney, Agent, or Firm*—David M. Bunnell

[57] ABSTRACT

Ferrite recording head members are coated with a layer of silicon nitride prior to filling the gap between the members with nonmagnetic material. The silicon nitride coating protects the ferrite member from attack by the nonmagnetic material.

4 Claims, 1 Drawing Figure

PATENTED MAY 27 1975 3,886,025
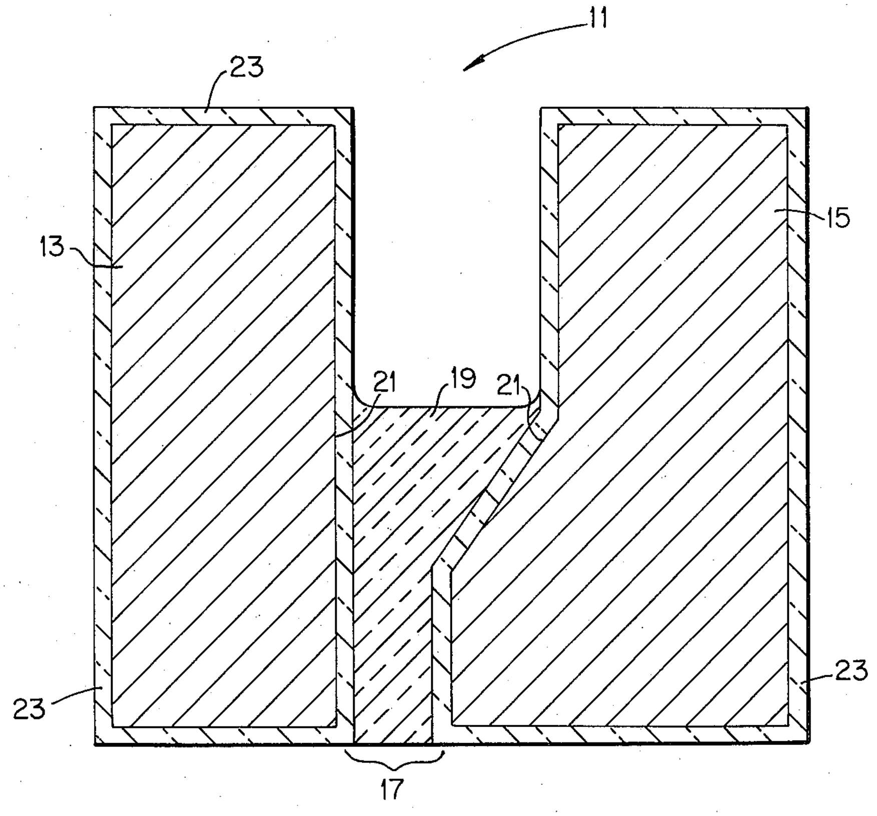

FERRITE HEAD

BACKGROUND OF THE DISCLOSURE

This invention relates generally to magnetic recording heads and more specifically to ferrite heads and their manufacture.

Ferrite heads comprise two ferrite members which are separated by a gap filled with a nonmagnetic material, for example glass. A problem which arises in the manufacture of ferrite heads is that the glass sometimes attacks the ferrite material in the gap area. This can change the size of the gap so that the gap dimensions are not maintained within acceptable tolerances and the recording properties of the head are adversely effected.

An improved ferrite head structure and manufacturing process is provided to avoid the above difficulties.

BRIEF SUMMARY OF THE INVENTION

In accordance with this invention there is provided a ferrite head formed of two ferrite members which are coated with a layer of silicon nitride prior to the application of the gap filling material.

DESCRIPTION OF THE DRAWINGS

FIG. 1 is an elevational view, in section, of a ferrite head of the invention.

DETAILED DESCRIPTION

The foregoing and other objects, features and advantages of the invention will be apparent from the following more particular description of a preferred embodiment of the invention as illustrated in the accompanying drawing.

Turning now to the drawing, ferrite head 11 is formed of two ferrite members 13 and 15 which are separated by a gap 17. The ferrite members generally consist of the oxides of various bivalent metals with ferric oxide such as zinc ferrite or nickel zinc ferrite and can be of a single crystal or of a polycrystalline sintered structure. The gap width dimension is in the magnitude of 0.1 mil or less and is filled with a non-magnetic material 19, for example, glass. The head is conveniently formed by positioning members 13 and 15 with surface portions 21 opposed to each other and flowing the molten glass gapping material into gap 17. The heads are then incorporated into recording head assemblies. Such heads and assemblies are well known in the art and are described for example in U.S. Pat. Nos. 3,562,444; 3,544,982 and 3,479,738.

To protect the ferrite head members 13 and 15 from possible attack due to contact with the hot non-magnetic gap forming material 19, the members are coated with a thin layer 23 of silicon nitride ($Si_3N_4$). The layer preferably has a thickness of from about 200 to 1,000 Angstroms. The layer can either be selectively applied to the opposed surface portions 21 or can be applied to the other surfaces of members 13 and 15 as well. In the latter case the silicon nitride layer acts as a protective coating layer for the head 11 against abrasion or the effects of other mechanical or environmental conditions to which the head structure may be subjected to or encountered during use.

The silicon nitride layer 23 is applied by known techniques such as vapor phase deposition by pyrolysis of silicon compounds in the presence of nitrogen or a nitrogen containing compound. For example, silicon hydride (silane) is pyrolyzed in the presence of ammonia with a nitrogen carrier gas stream with the substrate heated in a chamber at a temperature above 600°C (850°–900°C for example). According to another suitable method, silicon tetrachloride is reacted with ammonia on the heated ferrite substrate. A suitable technique is described, for example, in RCA Review, pages 443–449 where silicon nitride is used as a bonding layer between glass and metals.

The gap forming materials should match the thermal expansion characteristics of the ferrite material. Suitable gap forming materials include for example the glasses described in U.S. Pat. No. 3,562,444 and IBM Technical Disclosure Bulletin Vol. 9 No. 11 p. 1,475 April, 1967 having the compositions:

| Glass A | Wt. per cent | Glass B | Wt. Percent |
|---|---|---|---|
| $SiO_2$ | 30.8 | CaO | 7.9 |
| PbO | 14.8 | BaO | 41.8 |
| $B_2O_3$ | 19.9 | $B_2O_3$ | 9.3 |
| $Al_2O_3$ | 3.8 | $SiO_2$ | 34.1 |
| BaO | 26.3 | $Al_2O_3$ | 6.4 |
| $As_2O_3$ | 0.5 | $AsO_3$ | 0.5 |
| CaO | 3.9 | | |

While the invention has been particulary shown an described with reference to a preferred embodiment thereof, it will be understood by those skilled in the art that the foregoing and other changes in form and details may be made therein without departing from the spirit and scope of the invention.

We claim:

1. In a process for forming a ferrite head having a pair of ferrite members and a glass filled gap therebetween in which said glass filled is formed by positioning said ferrite members so that the gap forming surfaces are opposed to each other and flowing molten glass gapping material into said gap, the improvement which comprises forming a layer of silicon nitride on said members which layer is at least co-extensive with said glass.

2. The process of claim 1 wherein the entire surfaces of the ferrite members are coated with silicon nitride.

3. The process of claim 1 wherein said silicon nitride layer has a thickness of from about 200 to 1,000 angstroms.

4. The process of claim 1 wherein said silicon nitride coating is applied by heating the ferrite members in the presence of a gaseous mixture of a silicon compound and ammonia.

* * * * *

UNITED STATES PATENT OFFICE
CERTIFICATE OF CORRECTION

PATENT NO. : 3,886,025
DATED : May 27, 1975
INVENTOR(S) : Jacob Riseman

It is certified that error appears in the above-identified patent and that said Letters Patent are hereby corrected as shown below:

Column 2, Line 44 after "filled" insert --gap--

Signed and Sealed this

*second* Day of *December 1975*

[SEAL]

*Attest:*

RUTH C. MASON
*Attesting Officer*

C. MARSHALL DANN
*Commissioner of Patents and Trademarks*